United States Patent
Sun

(10) Patent No.: US 9,965,147 B2
(45) Date of Patent: May 8, 2018

(54) DISPLAY METHOD AND ELECTRONIC DEVICE

(71) Applicant: LENOVO (BEIJING) CO., LTD., Beijing (CN)

(72) Inventor: Ziyan Sun, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 62 days.

(21) Appl. No.: 14/386,532

(22) PCT Filed: Dec. 17, 2013

(86) PCT No.: PCT/CN2013/089720
§ 371 (c)(1),
(2) Date: Sep. 19, 2014

(87) PCT Pub. No.: WO2014/094604
PCT Pub. Date: Jun. 26, 2014

(65) Prior Publication Data
US 2015/0286347 A1    Oct. 8, 2015

(30) Foreign Application Priority Data
Dec. 17, 2012  (CN) .......................... 2012 1 0549575

(51) Int. Cl.
G06F 3/048    (2013.01)
G06F 3/0482   (2013.01)
G06F 3/0484   (2013.01)
G06F 3/0481   (2013.01)
G06F 3/0485   (2013.01)

(52) U.S. Cl.
CPC ........ *G06F 3/0482* (2013.01); *G06F 3/04842* (2013.01); *G06F 3/0485* (2013.01); *G06F 3/04817* (2013.01)

(58) Field of Classification Search
None
See application file for complete search history.

(56) References Cited

U.S. PATENT DOCUMENTS

| | | | | |
|---|---|---|---|---|
| 2010/0083190 A1* | 4/2010 | Roberts | ............... | G06F 3/04883 715/863 |
| 2010/0311445 A1* | 12/2010 | Kim | ....................... | G06F 3/0485 455/466 |
| 2013/0198690 A1* | 8/2013 | Barsoum | ................. | G06F 3/017 715/822 |

FOREIGN PATENT DOCUMENTS

| | | |
|---|---|---|
| CN | 101630222 | 1/2010 |
| CN | 102147696 | 8/2011 |

OTHER PUBLICATIONS

Christopher R. Wren, Retrieving Contact Information Based on Image Recognition Searches, Dec. 13. 2012, NewsRx, p. 176.*
(Continued)

*Primary Examiner* — Tam Tran
(74) *Attorney, Agent, or Firm* — Dentons US LLP

(57) ABSTRACT

Disclosed is a display method, which is used for improving operation efficiency. The method comprises detecting and obtaining a first operation; and responding to the first operation, and displaying a data list in a first display subarea, wherein a first sub data list identifier corresponding to a first sub data list of M sub data lists is displayed in a first location of the first display subarea. Also disclosed is an electronic device used for realizing the method.

14 Claims, 5 Drawing Sheets

(56) References Cited

OTHER PUBLICATIONS

Lim at al., Object Identification System and Method of Identifying an Object Using the Same, Dec. 13, 2012, NewsRx, p. 1302.*
Lenovo (Beijing) Co., Ltd.; International Application No. PCT/CN2013/089720 filed on Dec. 17, 2013, Patent Cooperation Treaty (PCT) International Preliminary Report on Patentability for International Application No. PCT/CN2013/089720 in English, issued on Jun. 23, 2015, and the Written Opinion of the International Searching Authority, dated Mar. 20, 2014, the International Bureau of WIPO, Switzerland; 7 pages.
International Search Report corresponding to PCT/CN2013/089720 dated Mar. 20, 2014; 8 pages.
Chinese Patent Application No. 201210549575.X, Chinese Patent Office, First Office Action dated May 5, 2016; 7 pages.
English Text Translation of First Office Action for Chinese Patent Application No. 201210549575.X, Chinese Patent Office, First Office Action dated May 5, 2016; 4 pages.
English Text Translation of Chinese Published Application No. CN101630222 (A), published on Jan. 20, 2010; 5 pages.
English Text Translation of Chinese Published Application No. CN102147696 (A), published on Aug. 10, 2011; 14 pages.

* cited by examiner

DISPLAY METHOD AND ELECTRONIC DEVICE

CROSS REFERENCE TO RELATED APPLICATIONS

This application is a national phase application based on international application number PCT/CN2013/089720, filed on Dec. 17, 2013, which claims priority of Chinese Patent Application No. 201210549575.X, filed on Dec. 17, 2012, the contents of both of which are incorporated by reference herein in their entireties.

BACKGROUND

The present disclosure relates to a field of computer and embedded type, and particularly relates to a display method and an electronic apparatus.

With the development of science and technology, electronic technology has progressed rapidly, and people now enjoy more kinds of electronic products. Now, people can enjoy comfortable lives brought by the development of the science and technique through various kinds of electronic apparatus. For example, electronic devices, such as a PAD (a tablet computer), have become essential part in people's lives, enabling users to make phone calls, send short messages, and connect to a network, which is able to enhance contact with other people and obtain various kinds of information.

If several people need to view a display screen of the same electronic apparatus at the same time, for example in a conference, and if the size of the display screen is relatively small, the users' view will be impaired. Thus, a PAD having a large size display screen is a convenient solution. Several users can operate the PAD at the same time without interfering with each other.

The inventor of this application found at least the following common technical problems in the procedure of implementing the technical solution of the embodiments:

In a conventional PAD with a large screen, at the time of displaying a menu item, if a plurality of objects are included under one menu item, they are displayed respectively by using a manner of movement. Thus, even if the menu item includes corresponding identifications, an object in the menu item may be still displayed in a display region after the identifications move out of the display region in a procedure of the movement, so the user cannot know in which specific menu item the displayed object is, and thus does not know whether the corresponding object is the object he requires, and may need to execute a further operation to decide which object is selected. Thus, the operating procedure is complex, time is wasted, and operational efficiency is low.

SUMMARY

The embodiments provide a display method and an electronic apparatus for solving the conventional technical problem of low operational efficiency and implementing a technical means of improving operational efficiency.

One aspect of the embodiments provides a display method applied in an electronic apparatus having a display module including a display region of which a first display sub region is able to display a data list including M sub data lists, each of the sub data lists in the M sub data lists corresponds to a sub data list identification, N sub data lists in the M sub data lists include at least one display object, M is an integer not less than 2, N is a positive integer, and the sub data list identification is positioned at an original position of the at least one display object corresponding thereto. The method includes the following steps:

Detecting to obtain a first operation; and

Responding to the first operation to display the data list in the first display sub region, wherein a first sub data list identification corresponding to a first sub data list in the M sub data lists is displayed at a first position of the first display sub region.

Preferably, the step of responding to the first operation to display the data list in the first display sub region specifically includes responding to the first operation to display the data list, wherein the first sub data list identification corresponding to the first sub data list in the M sub data lists is displayed at the first position of the first display sub region, a second sub data list identification corresponding to a second sub data list in the M sub data lists is displayed at a second position of the first display sub region and, the first position is different from the second position.

Preferably, after responding to the first operation to display the data list in the first display sub region, it further includes steps of:

Detecting to obtain a second operation for changing a relative position of the M sub data lists with the first display sub region; and Responding to the second operation to move the M sub data lists in the first display sub region, wherein, in the procedure of movement, a third position of the first display sub region in the display region is not changed.

Preferably, after responding to the second operation to move the M sub data lists in the first movement sub region, it further includes steps of:

Deciding whether the last display object in the at least one display objects included in the first sub data list has moved to first position; and Controlling the first sub data list identification to continue to be displayed in the first position when a decision is made that the last display object in the at least one display object included in the first sub data list has not moved to the first position.

Preferably, before deciding whether the last display object in the at least one display object included in the first sub data list moves to the first position, it further includes the step of controlling the second sub data list identification to move from the second position to a fourth position of the first display sub region which is different from the second position.

Preferably, after deciding whether the last display object in the at least one display object included in the first sub data list has moved to the first position, it further includes step of:

Controlling the second sub data list identification corresponding to the second sub data list in at least two sub data lists to replace the first sub data list identification to be displayed at the first position, wherein the first sub data list is different from the second sub data list, and the first sub data list identification is different from the second sub data list identification.

Preferably, the display region further includes a second display sub region, which is different from the first display sub region, a menu is displayed in the second display sub region, and the menu includes at least one operation objects. Before detecting to obtain the first operation, it further includes steps of:

Detecting to obtain a third operation; and

Responding to the third operation to display the menu in the second display sub region.

Preferably, the step of responding to the first operation to display the data list in the first display sub region specifically includes responding to the first operation to display the first display sub region extended from the center of the first display sub region to the end portions thereof at the periphery of the second display sub region.

Preferably, the center of the second display sub region, the center of the first operation object in the at least one operation objects and the center of the first display sub region are aligned on one line.

Preferably, the shape of the second display sub region is circular.

Preferably, after responding to the first operation to display the data list in the first display sub region, it further includes steps of:

Obtaining a fourth operation for prohibiting the displaying of the data list; and Responding to the fourth operation to prohibit the displaying of the data list.

Preferably, after responding to the fourth operation to prohibit the displaying of the data list, it further includes the step of recording the third position of the first display sub region corresponding to the data list with respect to the display region to obtain third position information.

Preferably, after responding to the fourth operation to prohibit the displaying of the data list, it further includes steps of:

Obtaining a fifth operation for displaying the data list;

Responding to the fifth operation to determine that the first display sub region is positioned at the third position corresponding to the third position information; and Displaying the data list in the first display sub region.

Preferably, the shape of the data list is a loop of an arc.

Preferably, the first position is a position where one of the end portions of the data list is.

Another aspect of the embodiments provides an electronic apparatus having a display module including a display region of which a first display sub region is able to display a data list including M sub data lists, each of the sub data lists in the M sub data lists corresponds to a sub data list identification, N sub data lists in the M sub data lists include at least one display object, M is an integer not less than 2, N is a positive integer, and the sub data list identification is positioned at an original position of the at least one display object corresponding thereto. The electronic apparatus further includes:

An acquiring module for detecting to obtain a first operation; and

A responding module for responding to the first operation to display the data list in the first display sub region, wherein a first sub data list identification corresponding to a first sub data list in the M sub data lists is displayed at a first position of the first display sub region.

Preferably, the responding module is specifically for responding to the first operation to display the data list, wherein the first sub data list identification corresponding to the first sub data list in the M sub data lists is displayed at the first position of the first display sub region, and a second sub data list identification corresponding to a second sub data list in the M sub data lists is displayed at a second position of the first display sub region, and the first position is different from the second position.

Preferably, the acquiring module is further for detecting to obtain a second operation for changing a relative position of the M sub data lists with the first display sub region; and The responding module is further for responding to the second operation to move the M sub data lists in the first display sub region, wherein, in the procedure of movement, a third position of the first display sub region in the display region is not changed.

Preferably, the electronic apparatus further includes a deciding module and a control module;

The deciding module is for deciding whether a last display object in the at least one display object included in the first sub data list has moved to the first position; and The control module is for controlling the first sub data list identification to continue to be displayed in the first position when a decision is made that the last display object in the at least one display object included in the first sub data list has not moved to the first position.

Preferably, the control module is further for controlling the second sub data list identification to move from the second position to a fourth position of the first display sub region, which is different from the second position.

Preferably, the control module is further for controlling the second sub data list identification corresponding to the second sub data list in at least two sub data lists to replace the first sub data list identification to be displayed at the first position; wherein the first sub data list is different from the second sub data list, and the first sub data list identification is different from the second sub data list identification.

Preferably, the display region further includes a second display sub region which is different from the first display sub region, the second display sub region displays a menu therein, and the menu includes at least one operation object;

The acquiring module is further for detecting to obtain a third operation; and

The responding module is further for responding to the third operation to display the menu in the second display sub region.

Preferably, the responding module is specifically for responding to the first operation to display the first display sub region extended from the center of the first display sub region to the end portions thereof at the periphery of the second display sub region.

Preferably, the center of the second display sub region, the center of a first operation object in the at least one operation object and the center of the first display sub region are aligned on one line.

Preferably, the shape of the second display sub region is circular.

Preferably, the electronic apparatus further includes a prohibiting module;

The acquiring module is further for obtaining a fourth operation for prohibiting the displaying of the data list; and The prohibiting module is for responding to the fourth operation to prohibit the displaying of the data list.

Preferably, the electronic apparatus further includes a recording module for recording the third position of the first display sub region corresponding to the data list with respect to the display region to obtain third position information.

Preferably, the acquiring module is further for obtaining a fifth operation for displaying the data list;

The responding module is further for responding to the fifth operation to determine that the first display sub region is positioned at the third position corresponding to the third position information; and The display module is for displaying the data list in the first display sub region.

Preferably, the shape of the data list is a loop of an arc.

Preferably, the first position is a position where one of the end portions of the data list is.

The display method in the embodiments may be applied in the electronic apparatus having the display module including the display region of which the first display sub region is able to display the data list including the M sub data lists, each of the sub data lists in the M sub data lists corresponds to one sub data list identification, the N sub data lists in the M sub data lists includes at least one display object, M is an integer not less than 2, N is a positive integer, the sub data list identification is positioned at the original position of the at least one display object corresponding thereto, and the method may include:

Detecting to obtain the first operation; and
Responding to the first operation to display the data list, wherein the first sub data list identification corresponding to the first sub data list in the M sub data lists is displayed at the first position of the first display sub region.

In the embodiments, when the first operation is detected to be obtained, the electronic apparatus responds to the first operation to display the data list in the first display sub region, wherein, the first sub data list identification corresponding to the first sub data list in the M sub data lists may be displayed at the first position of the first display sub region; that is, the first sub data list identification is displayed fixed at the first position. Irrespective of whether the relative position between the data list and the first display sub region changes, as long as the display object included in the first sub data list is displayed in the first display sub region, that is, as long as the last display object in the display objects included in the first sub data list has not moved to the first position, the first sub data list identification is always displayed at the first position. Thus, it can prompt the user that display content in the first sub data list is still displayed in the first display sub region, so the user knows that the display object displayed in the first display sub region is specifically in the sub data list in time, so as to decide whether the corresponding display object is the display object he requires without a further operation to decide which object is selected, which simplifies an operating procedure, saving time and improving the operational efficiency.

DETAILED DESCRIPTION

The display method in the embodiments may be applied in the electronic apparatus having a display module including a display region of which a first display sub region is able to display the data list including the M sub data lists, each of the sub data lists in the M sub data lists corresponds to one sub data list identification, the N sub data lists in the M sub data lists include at least one display object, M is an integer not less than 2, N is a positive integer, and the sub data list identification is positioned at the original position of the at least one display object corresponding thereto. The method may include:

Detecting to obtain the first operation; and
Responding to the first operation to display the data list, wherein the first sub data list identification corresponding to the first sub data list in the M sub data lists is displayed at the first position of the first display sub region.

In the embodiments, when the first operation is detected to be obtained, the electronic apparatus responds to the first operation to display the data list in the first display sub region, wherein the first sub data list identification corresponding to the first sub data list in the M sub data lists may be displayed at the first position of the first display sub region; that is, the first sub data list identification is displayed fixed at the first position. Irrespective of whether the relative position between the data list and the first display sub region changes, as long as the display object included in the first sub data list is displayed in the first display sub region, that is, as long as the last display object in the display objects included in the first sub data list has not moved to the first position, the first sub data list identification is always displayed at the first position. Thus, it can prompt the user that display content in the first sub data list is still displayed in the first display sub region, so the user knows the display object displayed in the first display sub region is specifically in the sub data list in time, so as to decide whether the corresponding display object is the display object he requires without the further operation to decide which objects are selected, which simplifies the operating procedure, saving time and improving the operational efficiency.

Figure 1:
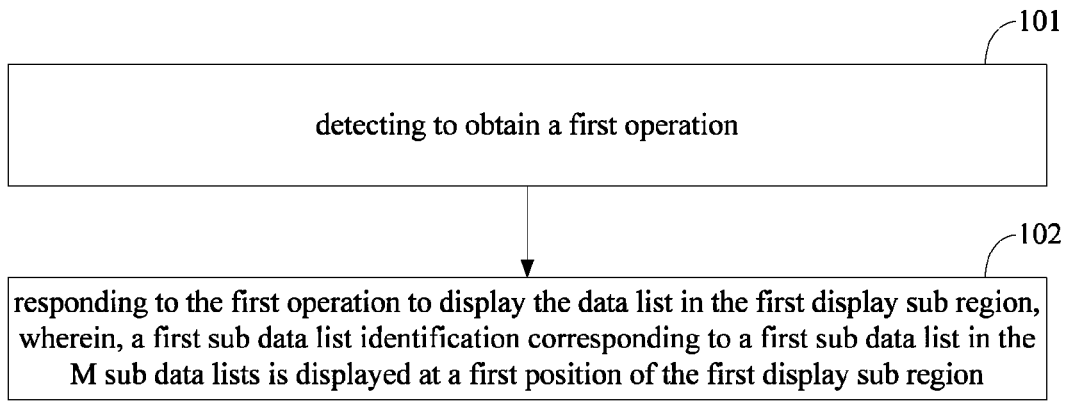
FIG. 1 is a main flow chart of the display method of the embodiments.

With reference to FIG. 1, the display method in the embodiments may be applied in the electronic apparatus having the display module including a display region of which a first display sub region is able to display the data list including the M sub data lists, each of the sub data lists in the M sub data lists corresponds to one sub data list identification, the N sub data lists in the M sub data lists include at least one display object, M is an integer not less than 2, N is a positive integer, and the sub data list identification is positioned at the original position of the at least one display object corresponding thereto. The main flow of the method is as follows:

Step 101: detecting to obtain the first operation.
In the embodiments, the first operation may be a click operation, or, if the display module is a touch control display module, the first operation may be a touch control operation, and so on.

The electronic apparatus may detect in real time, at certain timing or by being triggered whether the first operation is obtained.

In the embodiments, the first display sub region may be a partial region in the display region; that is, if an area of the display region is a first area, and an area of the first display sub region is a second area, the first area may be larger than the second area.

Preferably, in the embodiments, the display region may further include the second display sub region different from the first display sub region. In the embodiments, if the second display sub region corresponds to a third area, the first area may be equal to a sum of the second area and the third area, or the first area may also be larger than the sum of the second area and the third area.

Step 102: responding to the first operation to display the data list in the first display sub region, wherein the first sub data list identification corresponding to the first sub data list in the M sub data lists is displayed at the first position of the first display sub region.

After detecting the first operation, the electronic apparatus may respond to the first operation to display the data list in the first display sub region.

In the embodiments, a menu may be displayed in the second display sub region, the menu may include at least one operation objects; here, each operation object in the at least one operation object may be a first level menu item. When a first operation object in the at least one operation object is operated, the data list corresponding to the first operation object may be obtained. In the embodiments, the second display sub region is described as being a circular shape as an example, and the second display sub region is not limited to the circular shape, and it may also be other shapes: the embodiment does not make limitation thereto.

That is, in the embodiments, when the first operation executed with respect to the first operation object of the at least one operation objects is detected to be obtained, the electronic apparatus responds to the first operation to display the data list corresponding to the first operation object in the first display sub region.

In the embodiments, the operation object may be the first level menu item, the data list may be a second level menu item, and content included in the sub data list may be the content in the second level menu item.

Figure 2A:
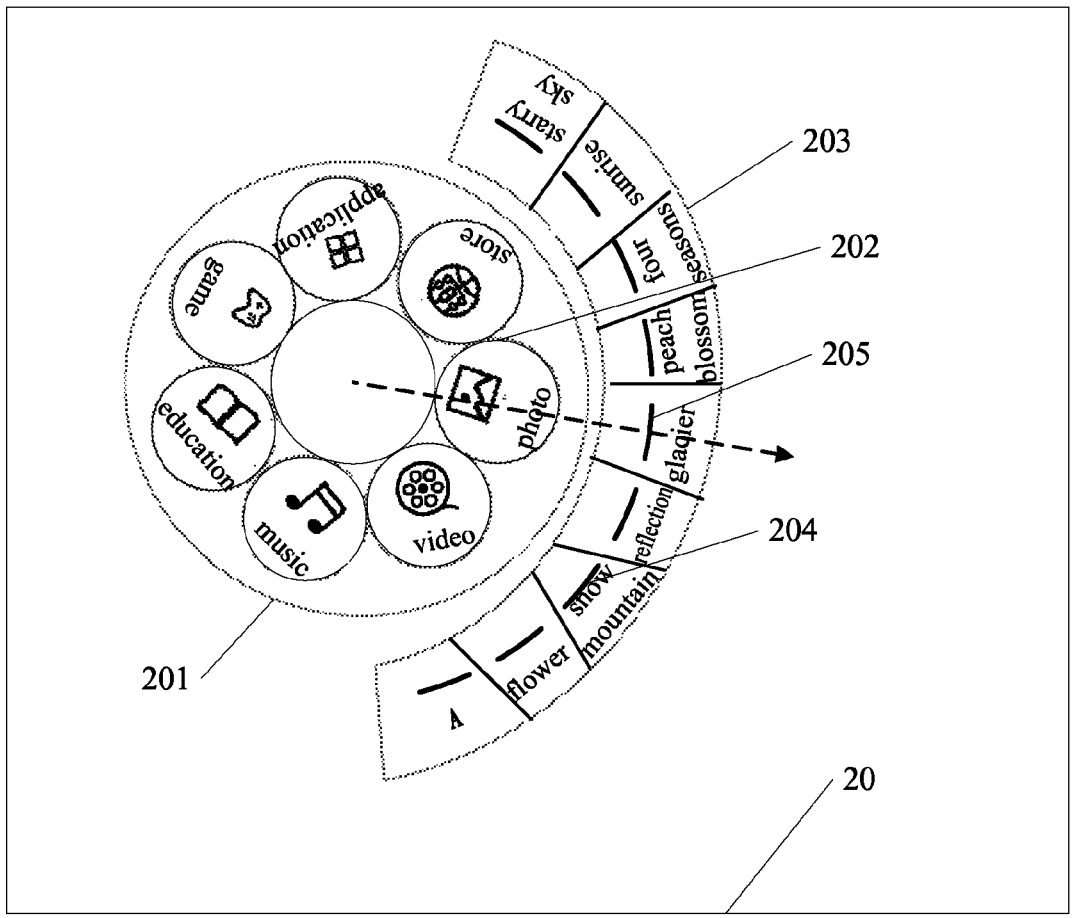
FIG. 2A is a schematic diagram of a first kind of display region of the embodiments.

For example, as shown in FIG. 2A, after the electronic apparatus is powered up, a second display sub region 201 is displayed at a display region 20, 7 operation objects are arranged on the second display sub region 201, and, in this embodiment, the second display sub region 201 is described as a circular shape as an example, but in other embodiments, it may also be an ellipse shape, a rectangle shape or other shapes. It is described by taking the operation object specifically being a photo, an application store, an application, a game, an education, a music file, and a video as examples. In these first operation objects, there is a file folder, for example the photo or the music; there is also a navigation menu item, for example the application. Of course, the first operation object corresponding to the application may also be regarded as the file folder, and the file folder may also be regarded as the navigation menu item.

Next, for example, if a user wants to look at the photo, the user selects the first operation object corresponding to the photo, i.e., a first operation object 202, by using a finger or a touch control pen or with a mouse. At this time, the electronic apparatus selects the first operation object 202. In particular, the first operation object is selected by, for example, a highlighted display, or a submerged manner, so that the user knows that the first operation object has been selected.

Next, the first display sub region is determined based on a display position and a display direction of the first operation object 202 on the display region 20. To acquire the display position of the first operation object 202, a coordinate value of the center of the first operation object 202 may be acquired directly, and to acquire the display direction, a direction of the center, i.e., the center of he circle of the second display sub region 201 pointing to the center of the first operation object 202 may be acquired as the display direction of the first operation object 202, as shown by a dotted line with an arrow in FIG. 2A, and then the first display sub region is determined based on the display position and the display direction. In an embodiment, the position of the center point of the first display sub region may be determined specifically according to the display position and the display direction. The center point is, for example, on a line extended from the center of the circle to the center of the first operation object 202. Otherwise, for example, the first display sub region may be configured as being displayed next to the second display sub region 201, then a specific position of the center of the first display sub region may be decided by a preset width of the first display sub region, so the first display sub region can be determined. That is, if the width of the first display sub region is definite, no matter which position the second display sub region 201 moves to on the display unit or which direction the first operation object 202 rotates to face, the first display sub region can be determined based on the display position and the display direction of the first operation object 202.

Then the first display sub region 203 is displayed on the display region 20. In particular, with reference to FIG. 2A, 8 display objects 204 are arranged on the first display sub region 203, and the 8 display objects 204 are sub file folders of the first operation object 202 of "photo", and the 8 display objects 204 are respectively a flower, a snow mountain, a reflection, a glacier, peach blossom, four seasons, sunrise and a starry sky, and the sub file folder of "photo" corresponds to the first sub data list identification, as shown with A in FIG. 2A. It is seen from FIG. 2A that the first display sub region 203 is of an arc ring shape, a dotted line with an arrow represents the display direction of the first operation object 202, the center of the first display sub region 203 is positioned on this dotted line, and the first display sub region 203 is in axial symmetry with respect to this dotted line. The display direction of a $q^{th}$ display object in the display object 204 is consistent with the display direction of the first operation object 202. In this embodiment, the $q^{th}$ display object is a display object 205, i.e. a file folder named as the glacier, the center of the display object 205 is the center of the first display sub region 203, and the center of the first operation object 202 and the center of the display object 205 are aligned.

In the embodiments, the first display sub region may be divided into L sub regions; here, each sub region in the L sub regions is able to display one display object or display one sub data list identification. Preferably, in the embodiments, the area of each sub region in the L sub regions may be equal to each other. Here, there is a separate line between each two sub regions to distinguish the two sub regions, so the user can watch each display object clearly at the time of displaying without confusing different display objects. L is an integer not less than 2.

For example, the first display sub region in FIG. 2A is divided into 9 sub regions; here, a first sub region displays the first sub data list identification corresponding to the first sub data list, that is, "A" in FIG. 2A, and remaining sub regions display 8 display objects included in the first sub data list respectively. There is a separate line between each two sub regions to distinguish the two sub regions.

In the embodiments, the electronic apparatus responds to the first operation to display the data list, wherein the first sub data list identification corresponding to the first sub data list in the M sub data lists is displayed at the first position of the first display sub region, the second sub data list identification corresponding to the second sub data list in the M sub data lists is displayed at the second position of the first display sub region, and the first position may be different from the second position.

In the embodiments, after responding to the first operation to display the data list in the first display sub region, the second operation may be detected to be obtained. The second operation in the embodiments may be to change the relative position of the M sub data lists with the first display sub region, for example the second operation may be an operation for moving one or more display objects in the first display sub region.

After detecting to obtain the second operation, the electronic apparatus responds to the second operation to move the M sub data lists in the first display sub region. Here, in the procedure of movement, the third position of the first display sub region in the display region is not changed; that is, the first display sub region and the display region are relatively fixed.

Figure 2B:
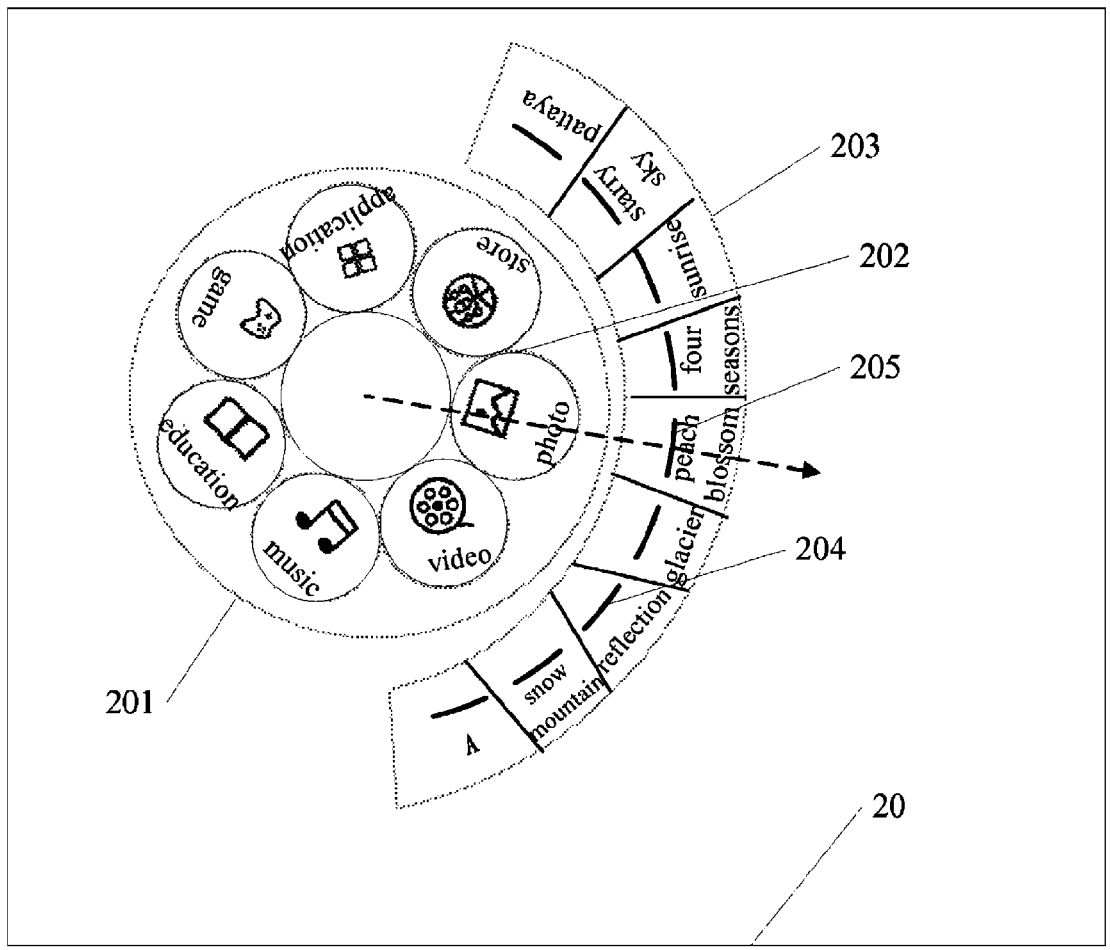
FIG. 2B is a schematic diagram of a second kind of display region of the embodiments.

In the present embodiment, as shown in FIG. 2B, after responding to the first operation, the electronic apparatus may change the relative position of the display object 204 included in the data list with the first display sub region 203. After changing the relative position, the first display sub region 203 may still display 8 display objects 204, and the 8 display objects 204 displayed currently are respectively the snow mountain, the reflection, the glacier, the peach blossom, the four seasons, the sunrise, the starry sky, and Pattaya. The 8 display objects 204 are still the second level menu items corresponding to the first operation object, thus it can be seen that the original first display object 204 of "flower" has been moved out of the first display sub region 203, and a new display object 204 of "Pattaya" is moved into the first display sub region 203. The display object 204 displayed currently in the first display sub region 203 is the display object 204 of the operation object of "photo"; that is, a last operation object in the display object 204 included in the operation object of "photo" has not moved to the first position, so the first sub data list identification A is still displayed at the first position.

It is seen from FIG. 2A and FIG. 2B that, in the embodiments of FIG. 2A and FIG. 2B, the first display sub region 203 may be divided into 9 sub regions, the area of each sub region is equal to each other, and there is a separate line between each two sub regions.

In the embodiments, before deciding whether the last display object in the at least one display object included in the first sub data list has moved to the first position, the second sub data list identification corresponding to the second sub data list is controlled to move from the second position to the fourth position of the first display sub region, and the second position is different from the fourth position.

Figure 3A:
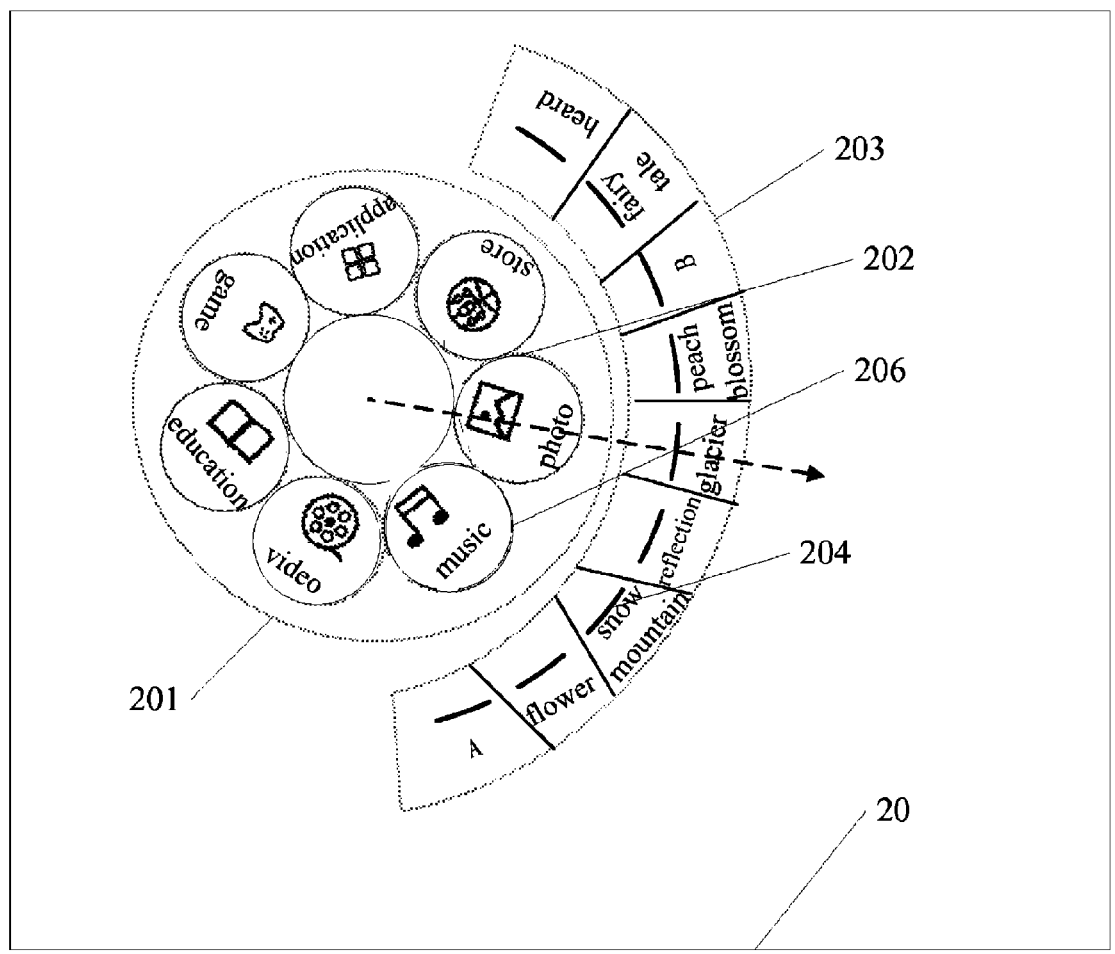
FIG. 3A is a schematic diagram of a third kind of display region of the embodiments.

For example, as shown in FIG. 3A, before the movement, the first display sub region 203 is displayed on the display region 20 and 7 display objects 204 are arranged on the first display sub region 203, 5 display objects 204 in the 7 display objects 204 are the sub file folder of the first operation object 202 of "photo", and the 5 display objects 204 are respectively the flower, the snow mountain, the reflection, the glacier and the peach blossom. The remaining 2 display objects 204 in the 7 display objects 204 are the sub file folder of the second operation object 206 of "music"; the 2 display objects 204 are respectively fairy tale and heard. The sub file folder of "photo" corresponds to the first sub data list identification, as shown with A in FIG. 3A, and the sub file folder of "music" corresponds to the second sub data list identification, as shown with B in FIG. 3A. The first sub data list identification is positioned at a start position of the respective display objects 204 included in the first sub data list, and the second sub data list identification is positioned at a start position of the respective display objects 204 included in the second sub data list.

Figure 3B:
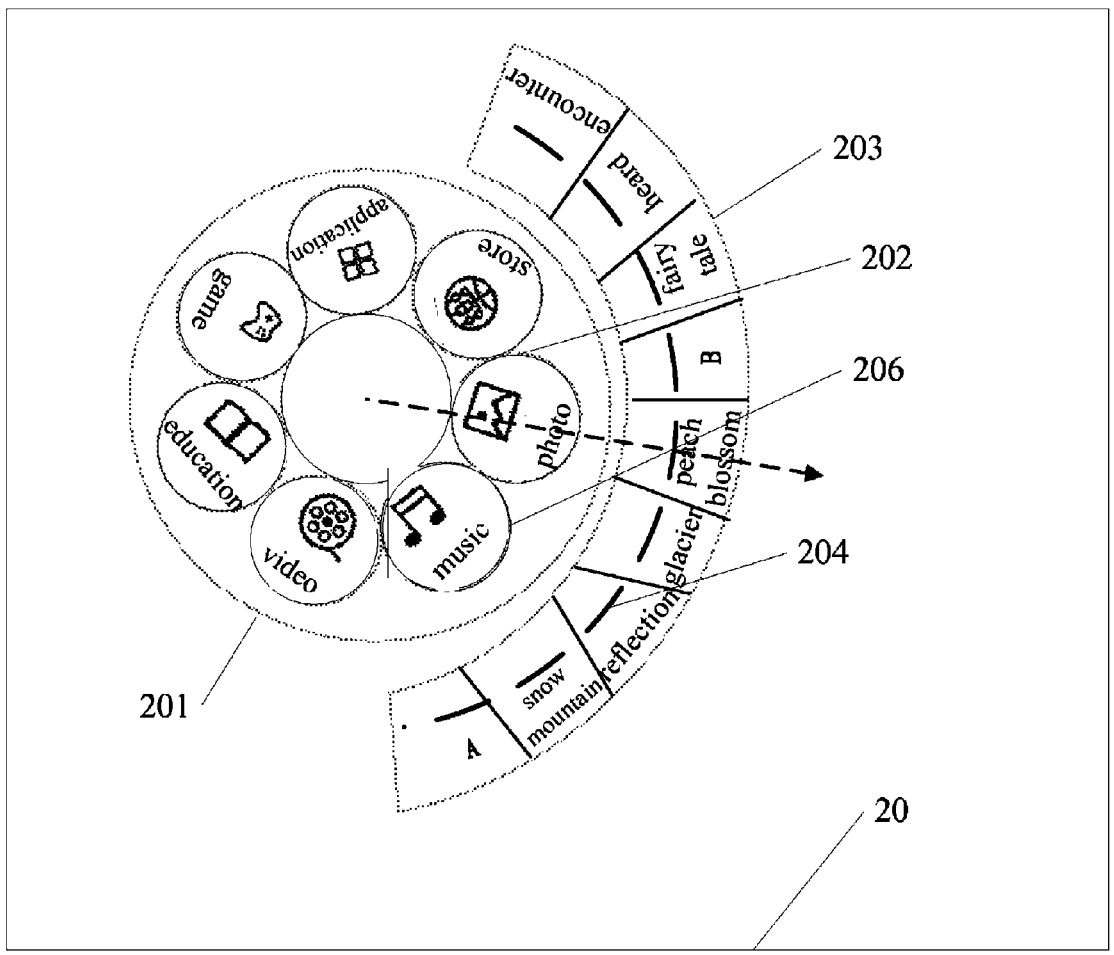
FIG. 3B is a schematic diagram of a fourth kind of display region of the embodiments.

For example, as shown in FIG. 3B, after the movement, the first display sub region 203 is displayed on the display region 20 and 7 display objects 204 are arranged on the first display sub region 203, 4 display objects 204 in the 7 display objects 204 are the sub file folder of the first operation object 202 of "photo", and the 4 display objects 204 are respectively the snow mountain, the reflection, the glacier and the peach blossom. The remaining 3 display objects 204 in the 7 display objects 204 are the sub file folder of the second operation object 206 of "music" and the 3 display objects 204 are respectively fairy tale, heard and encounter. The sub file folder of "photo" corresponds to the first sub data list identification, as shown with A in FIG. 3B, and the sub file folder of "music" corresponds to the second sub data list identification, as shown with B in FIG. 3B. Since, after the movement, the last display object 204 in the display object 204 included in the first sub data list has still not moved to the first position, the first sub data list identification is still positioned at, the first position, and at the same time, a position corresponding to the second sub data list identification is moved from the second position to the fourth position.

In the embodiments, after deciding whether the last display object in the at least one display object included in the first sub data list has moved to the first position, if it is decided that the last display object in the at least one display object included in the first sub data list has moved to the first position, the second sub data list identification corresponding to the second sub data list in the at least two sub data lists may be controlled to replace the first sub data list identification to be displayed at the first position; here, the first sub data list is different from the second sub data list and the first sub data list identification is different from the second sub data list identification.

Figure 3C:
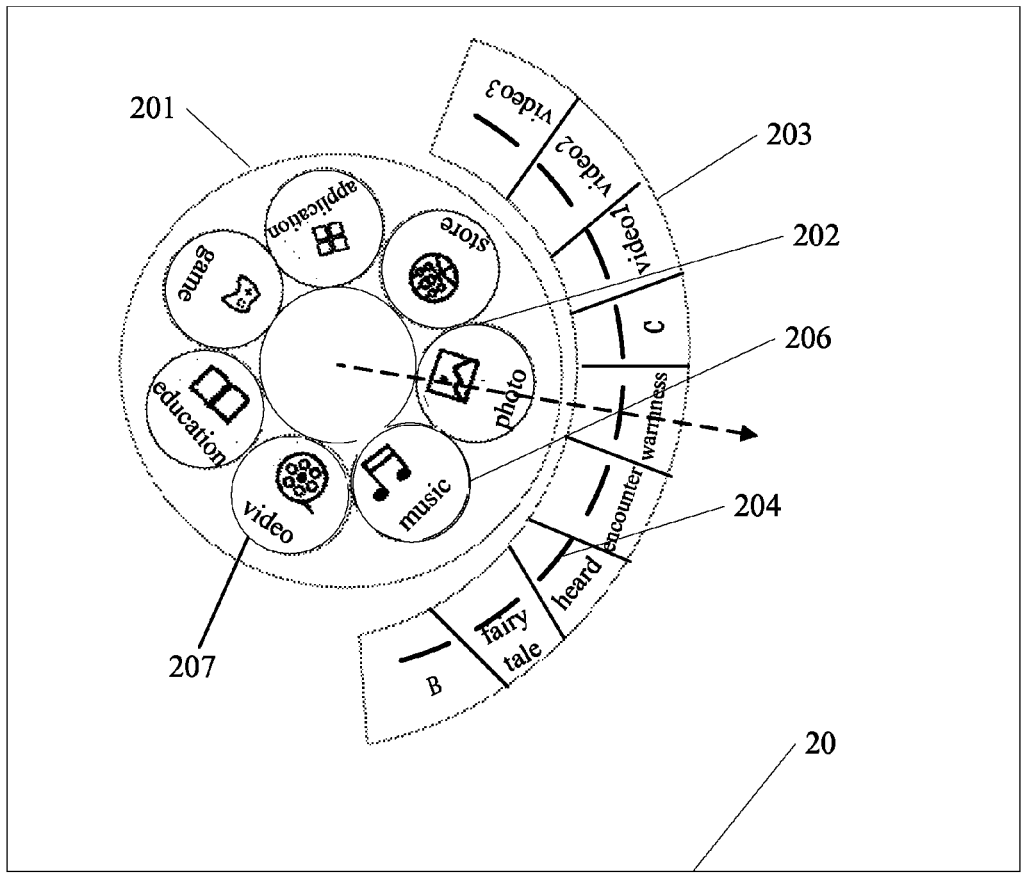
FIG. 3C is a schematic diagram of a fifth kind of display region of the embodiments.

For example, as shown in FIG. 3C, after the movement, the first display sub region 203 is displayed on the display region 20 and 7 display objects 204 are arranged on the first display sub region 203, 4 display objects 204 in the 7 display objects 204 are the sub file folder of the second operation object 206 of "music", and the 4 display objects 204 are respectively the fairy tale, the heard, the encounter and warmness, the remaining 3 display objects 204 in the 7 display objects 204 are sub file folders of the third operation object 207 of "video", and the 3 display objects 204 are respectively video 1, video 2 and video 3. The sub file folder of "music" corresponds to the second sub data list identification, as shown with B in FIG. 3C, and the sub file folder of "video" corresponds to the third sub data list identification, as shown with C in FIG. 3C. Since, after the movement, the last display object 204 in the display objects 204 included in the first sub data list has moved to the first position, the electronic apparatus may control the second sub data list identification to replace the first sub data list identification to be displayed at the first position; that is, "B" in FIG. 3C replaces "A" to be displayed at the first position, and at the same time a position corresponding to the third sub data list identification moves from the second position to the fourth position.

Here, in FIG. 2A, FIG. 2B, FIG. 3A, FIG. 3B and FIG. 3C, the first display sub region is of an arc ring shape.

In the embodiments, the second display sub region may be configured as a circular shape. Since the electronic apparatus in the embodiments may be the electronic apparatus with a large size display screen, for example a large PAD (a tablet computer), it can be used by placing it on the ground or a table horizontally at the time of usage, and since it has a large size display screen, thus there may be a plurality of users at the same time. The plurality of users may be positioned at different orientations of the electronic apparatus. The second display sub region is provided as a circular shape, and the first display sub region may rotate clockwise or counter-clockwise with the center of the circle as an axis, for example, as shown in FIG. 2A and FIG. 2B. Thus, irrespective of the user's position in relation to the electronic apparatus, he can rotate the second display sub region to rotate the operation object to be operated to his own forward direction, so as to facilitate the operation of the user, and make the electronic apparatus able to satisfy a usage of multi-directions, which improves the operability and operational convenience of the electronic apparatus and also improves the user's experience.

At the same time, the first display sub region may be provided as an arc ring. Irrespective of which position the second display sub region moves to on the display module or which direction the first operation object rotates to face, the first display sub region can be determined according to the display position and the display direction of the first operation object. The user operates the first operation object in the second display sub region first, and before the user carries out the first operation to invoke the data list, he may rotate the first operation object to his own forward direction, thus, at the time of invoking the data list, the data list may also be positioned at his own forward direction so as to facilitate viewing. The data list may be also rotated with the center as the axis, and the user may rotate the display object he requires in the data list to his own forward direction, which further improves the operational convenience of the electronic apparatus, and further ensures that the user is able to face the operation object and/or the display object to be operated in the forward direction, which facilitates the user operation and improves the operational efficiency while satisfying habits of ordinary users.

In the embodiments, the electronic apparatus may detect to obtain the third operation first, and, after obtaining the third operation, operation may respond to display the menu in the second display sub region.

For example, the third operation may be an operation of clicking any position in the display region, or the third operation, may be an operation of clicking a specific position in the display region, or the third operation, may be an operation of a specific gesture, or the third operation, may be an operation of pressing a specific key, or the third operation, may also be other operations; the embodiment does not make limitation thereto.

In the embodiments, after displaying the menu, the electronic apparatus may continue to detect to obtain the first operation and respond to the first operation to display the data list corresponding to the first operation object in the first display sub region. In particular, the electronic apparatus may respond to the first operation to display the first display sub region extended from the center of the first display sub region outwards to the end portions of the first display sub region at the periphery of the second display sub region and display the data list in the first display sub region.

In the embodiments, the center of the second display sub region, the center of the first operation object and the center of the first display sub region may be aligned on one line.

In the embodiments, the shape of the second display sub region may be circular, and the shape of the first display sub region may be an arc ring.

In the embodiments, after responding to the first operation to display the data list, a fourth operation may also be obtained, and the fourth operation may be an operation for prohibiting the displaying of the data list. After obtaining the fourth operation, the electronic apparatus may respond to the fourth operation to prohibit the displaying of the data list.

For example, when the user does not need to view the data list, the user may cause the electronic apparatus to prohibit the displaying of the data list by taking the fourth operation. Thus, interference to the user may be avoided, to improve the efficiency of the electronic apparatus.

Preferably, in the embodiments of the present disclosure, after responding to the fourth operation to prohibit the displaying of the data list, it further records the third position of the first display sub region corresponding to the data list with respect to the display region to obtain third position information corresponding to the third position.

In the embodiments, after responding to the fourth operation to prohibit the displaying of the data list, a fifth operation may also be obtained, which may be an operation for displaying the data list. After obtaining the fifth operation, the electronic apparatus responds to display the data list in the first display sub region.

Optionally, the electronic apparatus may respond to the fifth operation to display the data list in the first display sub region, wherein the position of the first display sub region corresponding to the display region may be arbitrary, that is, the data list may be displayed randomly at the time of displaying the data list.

That is, the electronic apparatus may make the first display sub region to be positioned at any position of the display region, and the operation for the electronic apparatus is relatively simple.

Optionally, if the electronic apparatus records the third position information of the first display sub region with respect to the display region at the time of being prohibited from displaying, the electronic apparatus may respond to the fifth operation to display the data list in the first display sub region. Here, the position of the first display sub region with respect to the display region may be the third position.

That is, after prohibiting the first display sub region from being displayed and then displaying it again, the first display sub region may still be displayed at the original position to facilitate the user viewing.

The display method in the present disclosure is introduced by several specific embodiments hereinafter, and the following embodiments are mainly for explaining several possible application scenarios of the method. It needs to be understood that the embodiments are only for explaining the present disclosure, not for limiting the present disclosure. The embodiments, which are compliant with the idea of the present disclosure, are all within the range sought for protection by the present disclosure, and those skilled in the art will know how to modify according to the idea of the present disclosure.

Embodiment One

The electronic apparatus is a PAD of large size, and the touch screen of the PAD is a display module having a display region. A first display sub region may be a partial region in the display region; that is, if an area of the display region is a first area, and an area of the first display sub region is a second area, the first area may be larger than the second area.

In the present embodiment, the display region may further include a second display sub region, which is different from the first display sub region. In the present embodiment, if the second display sub region corresponds to a third area, the first area may be equal to a sum of the second area and the third area, or the first area may also be larger than the sum of the second area and the third area.

In the present embodiment, a menu may be displayed in the second display sub region. The menu may include at least one operation object, and each operation object in the at least one operation object may be a first level menu item. When a first operation object in the at least one operation object is operated, a data list corresponding to a first operation object may be obtained. In the present embodiment, the second display sub region is described as being a circular shape as an example.

In the present embodiment, the electronic apparatus may detect in real time, at certain timing or by being triggered, and if the first operation carried out with respect to the first operation object of the at least one operation object is detected to be obtained, the electronic apparatus may respond to the first operation to display the data list corresponding to the first operation object in the first display sub region.

In the present embodiment, the operation object may be the first level menu item, and the data list may be a second level menu item. The content included in the present embodiment the sub data list may be the content in the second level menu item.

For example, as shown in FIG. 2A, 7 operation objects are arranged on the second display sub region 201, and the second display sub region 201 is described as being a circular shape as an example.

The user carries out the first operation to the first operation object 202 in the second display sub region 201; for example, the first operation object 202 is the file folder of "photo", and the user carries out the touch control operation to the first operation object 202. At this time, the electronic apparatus selects the first operation object 202. The first operation object is selected and is represented by the highlighted display or the submerged manner, so that the user knows that the first operation object is selected.

Next, the first display sub region may be determined according to the display position and the display direction of the first operation object 202 on the display region 20, as shown in FIG. 2A.

Then, the first display sub region 203 is displayed on the display region 20. In particular, with reference to FIG. 2A, 8 display objects 204 are arranged on the first display sub region 203. These 8 display objects 204 are the sub file folders of the first operation object 202 of "photo", and these 8 display objects 204 are respectively the flower, the snow mountain, the reflection, the glacier, the peach blossom, the four seasons, the sunrise and the starry sky, and the sub file folder of "photo" corresponds to the first sub data list identification, as shown with A in FIG. 2A.

In the present embodiment, after responding to the first operation to display the data list in the first display sub region, a second operation may be detected to be obtained. In the present embodiment, the second operation may be for changing a relative position of the M sub data lists with the first display sub region; for example, the second operation may be an operation of moving one or more display objects in the first display sub region.

After detecting to obtain the second operation, the electronic apparatus responds to the second operation to move the M sub data lists in the first display sub region. Here, in the procedure of movement, the third position of the first display sub region in the display region is not changed; that is, the first display sub region and the display region are relatively fixed.

For example, as shown in FIG. 2B, after responding to the first operation, the electronic apparatus may change the relative position of the display object 204 included in the data list with the first display sub region 203. After changing the relative position, the first display sub region 203 may still display 8 display objects 204, and the 8 display objects 204 displayed currently are respectively the snow mountain, the reflection, the glacier, the peach blossom, the four seasons, the sunrise, the starry sky, and the Pattaya. The 8 display objects 204 are still the second level menu items corresponding to the first operation object, thus it can be seen that the original first display object 204 of "flower" has moved out of the first display sub region 203, and a new display object 204 of "Pattaya" moves into the first display sub region 203. The display object 204 displayed currently in the first display sub region 203 is the display object 204 of the operation object of "photo"; that is, a last operation object in the display object 204 included in the operation object of "photo" has not moved to the first position, so the first sub data list identification A is still displayed at the first position.

Embodiment Two

The electronic apparatus is a large PAD, and the touch screen of the PAD is the display module having the display region. The first display sub region may be a partial region in the display region; that is, if the area of the display region is the first area, and the area of the first display sub region is the second area, the first area may be larger than the second area.

In the present embodiment, the display region may further include the second display sub region different from the first display sub region. In the present embodiment, if the second display sub region corresponds to the third area, the first area may be equal to the sum of the second area and the third area, or the first area may also be larger than the sum of the second area and the third area.

In the present embodiment, the menu may be displayed in the second display sub region, the menu may include at least one operation object, here, each operation object in the at least one operation object may be the first level menu item. When the first operation object in the at least one operation object is operated, the data list corresponding to the first operation object may be obtained. In the present embodiment, the second display sub region is described as being a circular shape as an example.

In the present embodiment, the electronic apparatus may detect in real time, at certain timing or by being triggered, and if the first operation carried out with respect to the first operation object of the at least one operation object is detected to be obtained, the electronic apparatus may respond to the first operation to display the data list corresponding to the first operation object in the first display sub region.

In the present embodiment, the operation object may be the first level menu item, and the data list may be the second level menu item. The content included in the sub data list may be the content in the second level menu item.

For example, as shown in FIG. 2A, 7 operation objects are arranged on the second display sub region 201, and the second display sub region 201 is described as being a circular shape as an example.

The user carries out the first operation to the first operation object 202 in the second display sub region 201. For example, the first operation object 202 is the file folder of "photo", and the user carries out the touch control operation to the first operation object 202. At this time, the electronic apparatus selects the first operation object 202. This is shown by a highlighted display or the submerged manner, so that the user knows that the first operation object is selected.

Next, the first display sub region may be determined according to the display position and the display direction of the first operation object 202 on the display region 20, as shown in FIG. 3A.

Then the first display sub region 203 is displayed on the display region 20. In particular, as shown in FIG. 3A, before the movement, the first display sub region 203 is displayed on the display region 20 and 7 display objects 204 are arranged on the first display sub region 203, 5 display objects 204 in the 7 display objects 204 are the sub file folder of the first operation object 202 of "photo", and the 5 display objects 204 are respectively the flower, the snow mountain, the reflection, the glacier and the peach blossom. The remaining 2 display objects 204 in the 7 display objects 204 are the sub file folder of the second operation object 206 of "music", and the 2 display objects 204 are respectively fairy tale and heard. The sub file folder of "photo" corresponds to the first sub data list identification, as shown with A in FIG. 3A, and the sub file folder of "music" corresponds to the second sub data list identification, as shown with B in FIG. 3A. The first sub data list identification is positioned at the start position of the respective display objects 204 included in the first sub data list, and the second sub data list identification is positioned at the start position of the respective display objects 204 included in the second sub data list.

In the present embodiment, after responding to the first operation to display the data list in the first display sub region, a second operation may be detected to be obtained. In the present embodiment, the second operation may be to change the relative position of the M sub data lists with the first display sub region, for example the second operation may be an operation of moving one or more display objects in the first display sub region.

After detecting to obtain the second operation, the electronic apparatus responds to the second operation to move the M sub data lists in the first display sub region Here, in the procedure of movement, the third position of the first display sub region in the display region is not changed; that is, the first display sub region and the display region are relatively fixed.

For example, as shown in FIG. 3C, after the movement, the first display sub region 203 is displayed on the display region 20 and 7 display objects 204 are arranged on the first display sub region 203, 4 display objects 204 in the 7 display objects 204 are the sub file folder of the second operation object 206 of "music", and the 4 display objects 204 are respectively the fairy tale, the heard, the encounter and the warmness. The remaining 3 display objects 204 in the 7 display objects 204 are sub file folders of the third operation object 207 of "video", and the 3 display objects 204 are respectively video 1, video 2 and video 3. The sub file folder of "music" corresponds to the second sub data list identification, as shown with B in FIG. 3C, and the sub file folder of "video" corresponds to the third sub data list identification, as shown with C in FIG. 3C. Since, after the movement, the last display object 204 in the display objects 204 included in the first sub data list has moved to the first position, the electronic apparatus may control the second sub data list identification to replace the first sub data list identification to be displayed at the first position. That is, "B" in FIG. 3C replaces "A" to be displayed at the first position, and at the same time, a position corresponding to the third sub data list identification moves from the second position to the fourth position.

Embodiment Three

The electronic apparatus is a large PAD, and the touch screen of the PAD is the display module having a display region. The first display sub region may be a partial region in the display region; that is, if the area of the display region is the first area, and the area of the first display sub region is the second area, the first area may be larger than the second area.

In the present embodiment, the display region may further include the second display sub region, which is different from the first display sub region. In the present embodiment, if the second display sub region corresponds to the third area, the first area may be equal to the sum of the second area and the third area, or the first area may also be larger than the sum of the second area and the third area.

In the present embodiment, the electronic apparatus may detect to obtain the third operation first, and, after obtaining the third operation, the third operation may respond to the display the menu in the second display sub region.

For example, the third operation may be the operation of clicking any position in the display region, or the third operation, may be the operation of clicking the specific position in the display region, or the third operation, may be the operation of the specific gesture, or the third operation, may be the operation of pressing the specific key, or the third operation, may also be other operations, the embodiment does not make limitation thereto.

In the present embodiment, after displaying the menu, the electronic apparatus may continue to detect to obtain the first operation and respond to the first operation to display the data list corresponding to the first operation object in the first display sub region.

In the present embodiment, the menu may include at least one operation object, and here each operation object in the at least one operation object may be the first level menu item. When the first operation object in the at least one operation object is operated, the data list corresponding to the first operation object may be obtained. In the present embodiment, the second display sub region is described as being a circular shape as an example.

In the present embodiment, the electronic apparatus may detect in real time, at certain timing or by being triggered, and, if the first operation carried out with respect to the first operation object of the at least one operation object is detected to be obtained, the electronic apparatus may respond to the first operation to display the data list corresponding to the first operation object in the first display sub region.

In the present embodiment, the operation object may be the first level menu item, and the data list may be the second level menu item. The content included in the sub data list may be the content in the second level menu item.

For example, as shown in FIG. 2A, 7 operation objects are arranged on the second display sub region 201, and the second display sub region 201 is described as being a as the circular shape as an example.

The user carries out the first operation to the first operation object 202 in the second display sub region 201; for example, the first operation object 202 is the file folder of "photo", and the user carries out the touch control operation to the first operation object 202. At this time, the electronic apparatus selects the first operation object 202. This is shown by a highlighted display or the submerged manner, so that the user knows that the first operation object is selected.

Next, the first display sub region may be determined according to the display position and the display direction of the first operation object 202 on the display region 20, as shown in FIG. 2A.

Then the first display sub region 203 is displayed on the display region 20. In particular, with reference to FIG. 2A, 8 display objects 204 are arranged on the first display sub region 203. These 8 display objects 204 are the sub file folders of the first operation object 202 of "photo", and these 8 display objects 204 are respectively the flower, the snow mountain, the reflection, the glacier, the peach blossom, the four seasons, the sunrise and the starry sky, and the sub file folder of "photo" corresponds to the first sub data list identification, as shown with A in FIG. 2A.

In the present embodiment, after responding to the first operation to display the data list in the first display sub region, a second operation may be detected to be obtained. In the present embodiment, the second operation may be to change the relative position of the M sub data lists with the first display sub region, for example the second operation may be the operation of moving one or more display objects in the first display sub region.

After detecting to obtain the second operation, the electronic apparatus responds to the second operation to move the M sub data lists in the first display sub region. Here, in the procedure of movement, the third position of the first display sub region in the display region is not changed; that is, the first display sub region and the display region are relatively fixed.

For example, as shown in FIG. 2B, after responding to the first operation, the electronic apparatus may change the relative position of the display object 204 included in the data list with the first display sub region 203. After changing the relative position, the first display sub region 203 may still display 8 display objects 204, and the 8 display objects 204 displayed currently are respectively the snow mountain, the reflection, the glacier, the peach blossom, the four seasons, the sunrise, the starry sky and Pattaya, and the 8 display objects 204 are still the second level menu items corresponding to the first operation object. Thus, it can be seen that the original first display object 204 of "flower" has moved out of the first display sub region 203, and the new display object 204 of "Pattaya" is moved into the first display sub region 203. The display object 204 displayed currently in the first display sub region 203 is the display object 204 of the operation object of "photo"; that is, a last operation object in the display object 204 included in the operation object of "photo" has not been moved to the first position, so the first sub data list identification A is still displayed at the first position.

In the present embodiment, after responding to the first operation to display the data list, a fourth operation may also be obtained, which may be an operation for prohibiting the displaying of the data list. After obtaining the fourth operation, the electronic apparatus may respond to the fourth operation to prohibit the displaying of the data list.

Preferably, in the present embodiment, after responding to the fourth operation to prohibit the displaying of the data list, it further records the third position of the first display sub region corresponding to the data list with respect to the display region to obtain the third position information corresponding to the third position.

In the present embodiment, after responding to the fourth operation to prohibit the displaying of the data list, the fifth operation may also be obtained, which may be an operation for displaying the data list. After obtaining the fifth operation, the fifth operation responds to display the data list in the first display sub region.

Wherein, in the present embodiment, if the electronic apparatus records the third position information of the first display sub region with respect to the display region at the time of being prohibited from displaying, the electronic apparatus may respond to the fifth operation to display the data list in the first display sub region. Here, the position of the first display sub region with respect to the display region may be the third position.

Figure 4:
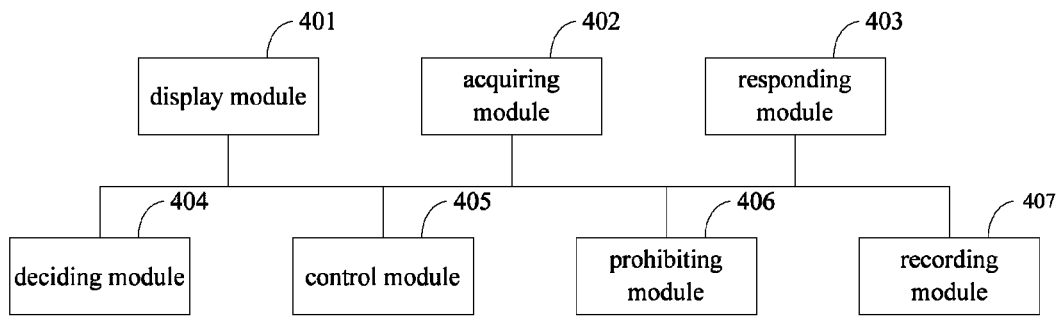
FIG. 4 is a detailed structural diagram of the electronic apparatus of the embodiments.

With reference to FIG. 4, the present disclosure further provides an electronic apparatus which may have a display module 401 including a display region of which a first display sub region is able to display a data list including M sub data lists, each of the sub data lists in the M sub data lists corresponds to a sub data list identification, N sub data lists in the M sub data lists include at least one display object, M is an integer not less than 2, N is a positive integer, and the sub data list identification may be positioned at an original position of the at least one display object corresponding thereto. The electronic apparatus may also include an acquiring module 402 and a responding module 403.

Preferably, the electronic apparatus may also include a deciding module 404, a control module 405, a prohibiting module 406, and a recording module 407.

The acquiring module 402 may be for detecting to obtain a first operation.

The acquiring module 402 may be also for detecting to obtain a second operation for changing a relative position of the M sub data lists with the first display sub region.

The display region further includes a second display sub region which is different from the first display sub region, the second display sub region displays a menu therein, and the menu includes at least one operation object; the acquiring module 402 may be also for detecting to obtain a third operation.

The acquiring module 402 may be also for obtaining a fourth operation for prohibiting the displaying of the data list.

The acquiring module 402 may be also for obtaining a fifth operation for displaying the data list.

The responding module 403 may be for responding to the first operation to display the data list in the first display sub region, here, a first sub data list identification corresponding to a first sub data list in the M sub data lists is displayed at a first position of the first display sub region.

The responding module 403 may be specifically for responding to the first operation to display the data list, wherein the first sub data list identification corresponding to the first sub data list in the M sub data lists is displayed at the first position of the first display sub region, and a second sub data list identification corresponding to a second sub data list in the M sub data lists is displayed at a second position of the first display sub region, and the first position is different from the second position.

The responding module 403 may be also for responding to the second operation to move the M sub data lists in the first display sub region, wherein, in the procedure of movement, a third position of the first display sub region in the display region is not changed.

The display region further includes a second display sub region different from the first display sub region, a menu is displayed in the second display sub region, and the menu includes at least one operation object. The responding module 403 may be also for responding to the third operation to display the menu in the second display sub region.

The responding module 403 may be specifically for responding to the first operation to display the first display sub region extended from the center of the first display sub region to the end portions thereof at the periphery of the second display sub region.

The responding module 403 may be also for responding to the fifth operation to determine that the first display sub region is positioned at the third position corresponding to the third position information.

In the embodiments, the center of the second display sub region, the center of the first operation object and the center of the first display sub region may be aligned on one line.

In the embodiments, the shape of the second display sub region may be circular.

The deciding module 404 may be for deciding whether a last display object in the at least one display object included in the first sub data list has moved to the first position.

The control module 405 may be for controlling the first sub data list identification to continue to be displayed in the first position when a decision result is no.

The control module 405 may be also for controlling the second sub data list identification to move from the second position to a fourth position of the first display sub region, which is different from the second position.

The control module 405 may be also for controlling the second sub data list identification corresponding to the second sub data list in at least two sub data lists to replace the first sub data list identification to be displayed at the first position when it is determined that the last display object in the at least one display object included in the first sub data list has moved to the first position; wherein the first sub data list is different from the second sub data list, and the first sub data list identification is different from the second sub data list identification.

The prohibiting module 406 may be for responding to the fourth operation to prohibit the displaying of the data list.

The recording module 407 may be for recording the third position of the first display sub region corresponding to the data list with respect to the display region to obtain third position information.

The display module 401 may be for displaying the data list in the first display sub region.

In the embodiments, the shape of the data list may be an arc ring.

In the embodiments, the first position may be a position where one of the end portions of the data list is.

The display method in the embodiments may be applied in the electronic apparatus having the display module including the display region of which the first display sub region is able to display the data lists including the M sub data lists, each of the sub data lists in the M sub data lists corresponds to one sub data list identification, the N sub data lists in the M sub data lists include at least one display object, M is an integer not less than 2, N is a positive integer, the sub data list identification is positioned at the original position of the at least one display object corresponding thereto, and the method may include:

Detecting to obtain the first operation; and

Responding to the first operation to display the data list, wherein the first sub data list identification corresponding to the first sub data list in the M sub data lists is displayed at the first position of the first display sub region.

In the embodiments, when the first operation is detected to be obtained, the electronic apparatus responds to the first operation to display the data list in the first display sub region, wherein the first sub data list identification corresponding to the first sub data list in the M sub data lists may be displayed at the first position of the first display sub region; that is, the first sub data list identification is displayed fixed at the first position. Irrespective of whether the relative position between the data list and the first display sub region changes, as long as the display object included in the first sub data list is displayed in the first display sub region, that is, as long as the last display object in the display objects included in the first sub data list has not moved to the first position, the first sub data list identification is always displayed at the first position. Thus, it can prompt the user that display content in the first sub data list is still displayed in the first display sub region, so the user knows the display object displayed in the first display sub region is specifically in the sub data list in time, so as to decide whether the corresponding display object is the display object he requires without the further operation to decide which objects are selected, which simplifies the operating procedure, saving time and improving the operational efficiency.

Those skilled in the art should understand that the embodiment can be provided as a method, a system, or a computer program product. Therefore, the present disclosure can adopt the form of a full hardware embodiment, a full software embodiment, or an embodiment combining software and hardware aspects. The present disclosure can also adopt form of one or more computer program product implemented on a computer usable storage medium (including, but not limited to, a magnetic disk storage and an optical memory or the like) including computer usable program code.

The present disclosure is described by referring to a flow chart and/or a block diagram of a method, an apparatus (a system) and a computer program product according to the embodiments. It should be understood that each flow and/or block in the flow chart and/or block diagram and the combination of the flow and/or block in the flow chart and/or block diagram can be implemented by computer program instructions. These computer program instructions can be provided to processors of a general purpose computer, a dedicated computer, an embedded processor or other programmable data processing apparatus to generate a machine, so that a device for implementing functions specified in one or more flows of the flow chart and/or one or more blocks of the block diagram is generated by the instructions executed by the processor of the computer or other programmable apparatus.

These computer program instructions can also be stored in a computer readable storage which is able to direct the computer or other programmable data processing apparatus to operate in specific manners, so that the instructions stored in the computer readable storage generate a manufactured article including a commander equipment; the commander equipment implements functions specified by one or more flows in the flow chart and/or one or more blocks in the block diagram.

These computer program instructions can be loaded to the computer or other programmable data processing apparatus, so that a series of operation steps are executed on the computer or other programmable apparatus to generate computer implemented processes, so that the instructions executed on the computer or other programmable apparatus provide steps for implementing functions specified in one or more flow of the flows chart and/or one or more block of the blocks diagram.

It is obvious that those skilled in the art can make various kinds of modifications and variations to the present disclosure without departing from the spirit and scope of the present disclosure. Thus, if these modifications and variations of the present disclosure fall within the scope of the claims of the present disclosure and the equivalent technology, the present disclosure intends to incorporate these modifications and variations.

What is claimed is:

1. A display method applied in an electronic apparatus having a display module including a display region, the method comprises the following steps:
   displaying a data list including the M sub data lists in a first display sub region of the display region, each of the sub data list in the M sub data lists corresponding to a sub data list identification, and N sub data lists in the M sub data lists including at least one display objects, wherein, M is an integer not less than 2, and N is a positive integer, and a sub data list identification is positioned at an original position of the at least one display objects corresponding thereto;
   detecting to obtain a first operation; and
   responding to the first operation to display the data list in the first display sub region, wherein, a first sub data list identification corresponding to a first sub data list in the M sub data lists is displayed at a first position of the first display sub region,
   wherein, the step of responding to the first operation to display the data list in the first display sub region comprises:
   responding to the first operation to display the data list, wherein, the first sub data list identification corresponding to the first sub data list in the M sub data lists is displayed at the first position of the first display sub region, and a second sub data list identification corresponding to a second sub data list in the M sub data lists is displayed at a second position of the first display sub region, and the first position is different from the second position,
   wherein, after responding to the first operation to display the data list in the first display sub region, the method further comprises steps of:
   detecting to obtain a second operation for changing a relative position of the M sub data lists with the first display sub region; and
   responding to the second operation to move the M sub data lists in the first display sub region, wherein, in a procedure of movement, a third position of the first display sub region in the display region is not changed,
   wherein, after responding to the second operation to move the M sub data lists in the first display sub region, the method further comprises steps of:
   deciding whether a last display object in the at least one display objects included in the first sub data list has moved to the first position, wherein the first position is located at boundary of the first display sub region; and
   controlling the first sub data list identification to be continued to be displayed at the first position when it decides that the last display object in the at least one display objects included in the first sub data list hasn't moved to the first position,
   wherein, after deciding whether the last display object in the at least one display objects included in the first sub data list has moved to the first position, the method further comprises step of:
   controlling the second sub data list identification corresponding to the second sub data list in at least two sub data lists to replace the first sub data list identification to be displayed at the first position and controlling all of display objects in the first sub data list and the first sub data list identification not to be displayed when it decides that the last display object in the at least one display objects included in the first sub data list has already moved to the first position;
   wherein, the first sub data list is different from the second sub data list, and the first sub data list identification is different from the second sub data list identification.

2. The method according to claim 1, wherein, before deciding whether the last display object in the at least one display objects included in the first sub data list has moved to the first position, the method further comprises step of:
   controlling the second sub data list identification to move from the second position to a fourth position of the first display sub region which is different from the second position.

3. The method according to claim 1, wherein, the display region further includes a second display sub region which is different from the first display sub region, a menu is displayed in the second display sub region, and the menu includes at least one operation objects, and before detecting to obtain the first operation, the method further comprises steps of:
   detecting to obtain a third operation; and
   responding to the third operation to display the menu in the second display sub region.

4. The method according to claim 3, wherein, the step of responding to the first operation to display the data list in the first display sub region specifically comprises:
   responding to the first operation to display the first display sub region extended from a center of the first display sub region to end portions thereof at periphery of the second display sub region.

5. The method according to claim 3, wherein, a center of the second display sub region, a center of the first operation object in the at least one operation objects and the center of the first display sub region are aligned on one line.

6. The method according to claim 3, wherein, a shape of the second display sub region is a circular shape.

7. The method according to claim 1, wherein, after responding to the first operation to display the data list in the first display sub region, the method further comprises steps of:
   obtaining a fourth operation for prohibiting from displaying the data list; and
   responding to the fourth operation to prohibit from displaying the data list.

8. The method according to claim 7, wherein, after responding to the fourth operation to prohibit from displaying the data list, the method further comprises step of:
   recording the third position of the first display sub region corresponding to the data list with respect to the display region to obtain third position information.

9. The method according to claim 8, wherein, after responding to the fourth operation to prohibit from displaying the data list, the method further comprises steps of:
   obtaining a fifth operation for displaying the data list;
   responding to the fifth operation to determine that the first display sub region is positioned at the third position corresponding to the third position information; and
   displaying the data list in the first display sub region.

10. The method according to claim 1, wherein, a shape of the data list is an arc ring.

11. The method according to claim 1, wherein, the first position is a position where one of end portions of the data list is.

12. An electronic apparatus having a display module including a display region, the electronic apparatus further comprises:
    memory, for storing computer program thereon; and
    processor, for executing the computer program to perform following steps:

an acquiring step for detecting to obtain a first operation; and a responding step for responding to the first operation to display a data list in a first display sub region, wherein, a first sub data list identification corresponding to a first sub data list in M sub data lists is displayed at a first position of the first display sub region;

wherein, the first display sub region in the display region is able to display the data list including the M sub data lists, each of the sub data list in the M sub data lists corresponds to a sub data list identification, N sub data lists in the M sub data lists includes at least one display object, M is an integer not less than 2, and N is a positive integer, the sub data list identification is positioned at an original position of the at least one display object corresponding thereto, wherein, the responding module is specifically for:

responding to the first operation to display the data list, wherein, the first sub data list identification corresponding to the first sub data list in the M sub data lists is displayed at the first position of the first display sub region, and a second sub data list identification corresponding to a second sub data list in the M sub data lists is displayed at a second position of the first display sub region, and the first position is different from the second position wherein, the acquiring step is further for:

detecting to obtain a second operation for changing a relative position of the M sub data lists with the first display sub region; and the responding step is further for:

responding to the second operation to move the M sub data lists in the first display sub region, wherein, in procedure of movement, a third position of the first display sub region in the display region is not changed, wherein, the processor executes the computer program to further perform a deciding step and a control step;

the deciding step is for deciding whether a last display object in the at least one display objects included in the first sub data list move to first position, wherein the first position is located at boundary of the first display sub region; and the control step is for controlling the first sub data list identification to be continued to be displayed at the first position when it decides that the last display object in the at least one display objects included in the first sub data list hasn't moved to the first position, wherein, the control step is further for:

controlling a second sub data list identification corresponding to a second sub data list in at least two sub data lists to replace the first sub data list identification to be displayed at the first position and controlling all of display objects in the first sub data list and the first sub data list identification not to be displayed when it decides that the last display object in the at least one display objects included in the first sub data list has already moved to the first position;

wherein, the first sub data list is different from the second sub data list and the first sub data list identification is different from the second sub data list identification.

13. The electronic apparatus according to claim 12, wherein, the display region further includes a second display sub region which is different from the first display sub region, a menu is displayed in the second display sub region, and the menu includes at least one operation objects, the acquiring module is further for detecting to obtain a third operation; and the responding module is further for responding to the third operation to display the menu in the second display sub region.

14. The electronic apparatus according to claim 12, wherein, the processor executes the computer program to further perform a prohibiting step;

the acquiring step is further for obtaining a fourth operation for prohibiting from displaying the data list; and the prohibiting step is for responding to the fourth operation to prohibit from displaying the data list.

* * * * *